(12) United States Patent
Altay et al.

(10) Patent No.: US 11,647,452 B2
(45) Date of Patent: May 9, 2023

(54) APPLICATION-DRIVEN USER SLICE SELECTION FOR MOBILE NETWORKS

(71) Applicant: NETSIA, INC., Santa Clara, CA (US)

(72) Inventors: Can Altay, Istanbul (TR); Beytullah Yigit, Istanbul (TR); Seyhan Civanlar, Istanbul (TR)

(73) Assignee: NETSIA, INC., Santa Clara, CA (US)

( * ) Notice: Subject to any disclaimer, the term of this patent is extended or adjusted under 35 U.S.C. 154(b) by 81 days.

(21) Appl. No.: 17/122,348

(22) Filed: Dec. 15, 2020

(65) Prior Publication Data

US 2021/0185601 A1 Jun. 17, 2021

Related U.S. Application Data

(60) Provisional application No. 62/949,437, filed on Dec. 17, 2019.

(51) Int. Cl.
| | | |
|---|---|---|
| *H04W 48/18* | (2009.01) | |
| *H04W 28/24* | (2009.01) | |
| *H04L 41/0893* | (2022.01) | |
| *H04L 47/24* | (2022.01) | |
| *H04L 47/80* | (2022.01) | |

(52) U.S. Cl.
CPC ......... *H04W 48/18* (2013.01); *H04L 41/0893* (2013.01); *H04L 47/24* (2013.01); *H04L 47/805* (2013.01); *H04W 28/24* (2013.01)

(58) Field of Classification Search
CPC ..... H04W 48/18; H04W 28/24; H04W 24/02; H04L 41/0893; H04L 47/24; H04L 47/805; H04L 41/0894
See application file for complete search history.

(56) References Cited

U.S. PATENT DOCUMENTS

| | | | |
|---|---|---|---|
| 2004/0098606 A1* | 5/2004 | Tan | ........................ G06Q 30/02 726/1 |
| 2017/0332421 A1* | 11/2017 | Sternberg | ............ H04W 72/048 |
| 2021/0219185 A1* | 7/2021 | Xin | ........................ H04W 28/10 |

* cited by examiner

*Primary Examiner* — Mandish K Randhawa
(74) *Attorney, Agent, or Firm* — IP Authority, LLC; Ramraj Soundararajan (57) ABSTRACT

An application service provider (ASP) subscribes to a slice of the network of the mobile operator to offer its users on mobile devices a better-quality transport service. For example, the ASP subscribes to and pays for, say, a premium network slice dedicated for the use of its premium users that are on mobile devices. When a premium user accesses the application (and gets authorized by it), the application sends identifiers of the application/user to the Slice Identifier Function (SIF) of the mobile operator, which in turn directs the configuration of the core network components as well as the RAN attached to said user's mobile device according to the application's slice policies. As another example, the ASP subscribes to and pays for the default network slice for a differentiated treatment. When SIF identifies the application, it gives its users a higher QoS/priority than other users within the same slice.

16 Claims, 6 Drawing Sheets

APPLICATION-DRIVEN USER SLICE SELECTION FOR MOBILE NETWORKS

RELATED APPLICATION

This application claims the benefit of provisional application 62/949,437 filed Dec. 17, 2019.

BACKGROUND OF THE INVENTION

Field of Invention

The present invention relates to a system and method for providing quality differentiation for application service providers within a mobile network by offering different slice SLAs.

Discussion of Related Art

Any discussion of the prior art throughout the specification should in no way be considered as an admission that such prior art is widely known or forms part of common general knowledge in the field.

One of the primary technical challenges facing mobile operators today is the ability to deliver a wide array of transport network performance characteristics that future applications and services will demand. Transport performance metrics such as bandwidth, latency, packet loss, security, and reliability greatly vary from one service to the other. For example, emerging applications such as remote operation of robots, massive IoT, and self-driving cars all require connectivity, but these three have vastly different characteristics in terms of packet delay and jitter. The combination of architecture flexibility, software programmability, and the needs of different business segments (medical, factories, military, public safety, etc.) and applications have led to the creation of the concept of network slicing in 5G mobile networks.

A network slice provides a convenient way to completely segment the network to support particular types of services or businesses. Furthermore, each slice can be optimized according to transport bandwidth, network coverage, security, and packetized data performance characteristics. Since the slices can be isolated from each other, as if they are physically separated both in the control and user planes, the user experience of the network slice will be as if being on a separate network. A network slice can span all domains of the operator's network including the virtual or physical network functions (VNF/PNF), the so-called (wire-line) core network including transport segments between User Plane Functions (UPF)s, and the Radio Access Network (RAN) including the fronthaul and backhaul transport segments. The 3GPP standards architected a sliceable 5G infrastructure to provide many logical network segments over a common single physical network (see 3GPP's TR 28.801 document titled 'Telecommunication management; Study on management and orchestration of network slicing for next generation network').

Technologies such as software defined networking (SDN), wherein control plane (CP) and user plane (UP) are separated, and network function virtualization (NFV) are the key enablers for breaking up the network into slices rapidly and efficiently. With network slicing, customizable and virtualized network components can be stitched together, using only software.

The 5G standardization efforts have gone into defining specific slice types and their requirements based on application/service. For example, the user equipment (UE) can now directly specify its desired slice using a new field in the packet header called Network Slice Selection Assistance ID (NSSAI). The Slice/Service Types (SST) within NSSAI is used to indicate the slice type. The standards already defined most commonly usable network slices and reserved the corresponding standardized SST values (see 3GPP document TS 23.501). For example, SST values of one, two and three are reserved for enhanced Mobile Broadband (eMBB), ultra-reliable and low-latency communications (uRLLC) and massive IoT (MIoT), respectively. A User Equipment (UE) is able to request up to eight slices at the time of registry into the network. The slices that a UE is eligible for are stored within Policy Control Function (PCF) in the form subscribed-NSSAI (sNSSAI). The Network Slice Selection Function (NSSF) contains all the supported sNSSAIs.

The Access and Mobility Management Function (AMF) of the core network retrieves the slices that are allowed by the user's subscription (sNSSAI) from PCF, and interacts with the Network Slice Selection Function (NSSF) of the core network to select the appropriate network slice instance for that traffic. 3GPP specifies Network Slice Management Function (NSMF) as a new virtual network management function in 5G whose sole role is to direct traffic to an appropriate slice in the User Plane (UP).

According to the session establishment or modification procedures in 5G's Service-Based Architecture (SBA), the user first connects to AMF as explained above. The AMF contacts Policy Control Function (PCF) to retrieve the UE control policies. Based on the policies, AMF then determines which Session Management Function (SMF) instance is best suited to handle the connection request for that slice by querying the Network Repository Function (NRF)-note that all SMF instances register with NRF as to which slices they support. There may be: (a) a single SMF in the network to handle all network slices, (b) a plurality of SMFs, one SMF serving each slice, or (c) a plurality of SMFs serving each slice. The SMF instance serving a UE may depend on the location of user's mobile device and/or other criteria. The AMF hands-over the session establishment task to the chosen SMF.

The SMF is primarily responsible for (a) selecting one of the User Plane Functions (UPFs) to forward the data packets of the user in the user plane (UP), and setting up the UPF configuration parameters to ensure proper routing of packets, while guaranteeing the delivery of user's data packets according to the slice requirements; (b) creating, updating and removing Protocol Data Unit (PDU) sessions and managing session context; (c) performing the role of Dynamic Host Configuration Protocol (DHCP) server and assigning a private IP address to the user from the DHCP address pool. The SMF is responsible for checking whether the UE requests are compliant with the user subscription, and for connectivity charging which is achieved by interacting with a Charging Function (CHF). Applications on the mobile device of the user can be admitted to different slices through simple configurations, for example, by using different IP addresses and/or port numbers.

Embodiments of the present invention are an improvement over prior art systems and methods.

SUMMARY OF THE INVENTION

The prior art described above provides no mechanism within the mobile network to recognize a specific application and its users (unless each packet's content is inspected). If such a mechanism were enabled, then the network could have treated the mobile users of applications in a differentiated way, and offer either (i) different slices to different user groups of an application, or (ii) different slices to different applications, or (iii) the users of certain key applications within the default slice a different QoS treatment. Furthermore, this unique mechanism would allow the mobile operator to acquire sizable revenues from the application service providers due to subscription to and use of slices. According to prior art, the mobile User Equipment (UE) can request different slices using the NSSAI field, but there is no mechanism provided for applications attached to the public Internet with, say, a wire-line connection, or attached to the edge-core-cloud of the mobile network to subscribe to and use a slice when its mobile users are actively using said application. Generally speaking, this invention addresses the aforementioned shortcoming (i) by allowing the applications to register its users to certain type of slices and (ii) by signaling the control network when the user signs in to the application. In an embodiment of this invention, a new type of control function within the mobile network is used to register applications to slices and to trigger a move of the user's packet traffic to a different slice (or a higher QoS treatment path).

The concept of slice must allow service applications to distinguish premium users to from regular users, wherein premium users use a so-called premium network slice (e.g., a faster, more reliable or larger bandwidth slice) while the regular users use a default slice, where there is only best-effort QoS to access a particular service application. Please note, that for simplicity, any slice that is not a default slice is named a 'premium slice' here without making a distinction on specific properties of different type of slices.

According to the first embodiment, the service applications subscribe to different slices for their different groups of subscribers. An application service provider may offer different grades of services that are priced differently based on the content type and content delivery quality. The simplest implementation is by offering 'Premium' and 'Basic' services. Premium service subscribers get a better-quality service experience (e.g., different levels of video compression and encoding for a more flexible video delivery, and/or more content variety, less packet latency during streaming, higher network availability, etc.). The application becomes the subscriber of a premium network slice dedicated to its premium service users on mobile devices. The rest of the users use the default network slice.

According to the second embodiment, the service applications subscribe to a default slice for all their subscribers, but with a differentiated treatment. The operator provides a better QoS/higher priority to all users of the application as compared to other users of the slice. Because this embodiment can be trivially derivable from the first embodiment, only the detailed implementation of the first embodiment is presented hereafter.

According to an aspect of this invention, the mobile user's slice usage is triggered by the application (not the user) at the time the user signs-in to the application. This is highly advantageous since the user does not need to subscribe to or know the slice that the application will be using in the network. As a result, the user equipment does not need to support capabilities of slice selection, and/or pay for the slice usage.

According to an aspect of this invention, a new control function called Slice Identifier Function (SIF) is presented to register applications and their mobile users to different slices. SIF has an embedded Control Network Exposure Function (C-NEF) that enables this new control plane function to interact with an application outside the realm of the operator's control network infrastructure.

When a mobile user signs-in to the application (using the default slice initially), SIF coordinates the delivery of the premium slice (or higher QoS/priority with a default slice) on the mobile network segment between the user and application. The switchover from default treatment to a premium treatment is achieved by SIF forcing a user configuration change procedure, well known in 3GPP standards. SIF interfaces with other control plane functions such as the Network Slice Management Function (NSMF) and Policy Control Function (PCF), as well as the User Plane Function (UPF) and service applications through C-NEF.

According to another aspect of this invention, the application first registers to SIF using a new 'registration notification' procedure created specifically for an application's subscription to a network slice. This registration procedure is achieved through an Internet connection between SIF and the application. This procedure optionally includes registration of application's subscribers as well. Upon completion of registration, SIF coordinates the configuration of the premium slice instance in the mobile network, and creates a policy for the premium user group. If the application subscribes to the default slice, then a policy is created for all the users of this application to receive a higher QoS/or priority over other users in the default slice.

In one embodiment, the service provider provides a menu of options with slice types and their associated SLAs to facilitate the application service provider's choice of a specific slice.

According to another aspect of this invention, when the registered application's mobile premium user initially connects to the mobile network using the default slice for application sign-in, the application recognizes the user and starts the <connection notification> procedure. Upon this procedure, SIF coordinates the switchover from the default slice to the premium slice. The user identification by SIF can be performed using the IP address and port number within the user's IP packet that is used for sign-in. SIF coordinates with the control network functions the translation of the IP address and port number into a user identifier that the mobile network understands.

In an embodiment of the invention, the <connection notification> includes a user identification, such as the user's telephone number, and user's IP address and user's port number that are identified directly from the incoming data packets from the user. The <connection notification> may include other user related information that it is locally stored by the application or retrieved from the user's data packets.

In one embodiment, the present invention provides a method comprising: at least one service application subscribing to a first Radio Access Network (RAN) slice for a first set of mobile users, the first RAN slice set aside for preferential treatment of the first set of mobile users, the first RAN slice also having associated with it a second set of mobile users, the first set of mobile users different than the second set of mobile users; and providing a higher Quality of Service (QoS) and/or a higher priority to the first set of mobile users of the at least one service application as compared to the second set of mobile users.

In another embodiment, the present invention provides a method comprising: a service application subscribing to a first, premium, Radio Access Network (RAN) slice for a set of premium mobile users, the first RAN slice set aside for preferential treatment of the premium mobile users; a set of non-premium mobile users assigned to a second RAN slice, the premium mobile users different than the non-premium mobile users; and providing a higher Quality of Service (QoS) and/or a higher priority to the premium mobile users of the service application as compared to the non-premium mobile users, wherein an application service provider provides different grades of services that are priced differently based on content type and content delivery quality, wherein the premium mobile users of the first, premium, RAN slice receiving a better quality service experience compared to the non-premium service users of the second RAN slice.

In yet another embodiment, the present invention provides a method comprising: at least one service application subscribing to a first Radio Access Network (RAN) slice for a first set of mobile users, the first RAN slice set aside for preferential treatment of the first set of mobile users, the first RAN slice also having associated with it a second set of mobile users, the first set of mobile users different than the second set of mobile users; providing a higher Quality of Service (QoS) and/or a higher priority to the first set of mobile users of the at least one service application as compared to the second set of mobile users, and presenting a Slice Identifier Function (SIF) to register the at least one service application and each of the first set of mobile users to the first RAN slice, wherein the SIF has an embedded Control Network Exposure Function (C-NEF) that enables a new control plane function to interact with the at least one service application.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device (e.g., a base station, UPF, SMF, controller, etc.) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device such as a base station, switch, controller, or a control function is a piece of networking component, including hardware and software that communicatively interconnects with other equipment of the network (e.g., other network devices, and end systems). Switches are represented as User Plane Function (UPF) in 5G networks which provide network connectivity to other networking equipment such as switches, gateways, and routers that exhibit multiple layer networking functions (e.g., routing, layer-3 switching, bridging, VLAN (virtual LAN) switching, layer-2 switching, Quality of Service, and/or subscriber management), and/or provide support for traffic coming from multiple application services (e.g., data, voice, and video).

The UPF also provides firewall and Network Address Translation (NAT) functions. The routing and configuration intelligence of UPF usually sits in a UPF controller (an SDN controller) within the control plane. The UPF controller may be implemented as an integral component of the SMF.

The User Equipment (UE) is a user device such as a cellular phone, pad, a mobile sensor, a computer or another type of equipment that wirelessly connects to the network. Any physical device in the network has a type, location, ID/name, Medium Access Control (MAC) address, and Internet Protocol (IP) address. Furthermore, a physical device can host a collection of VNFs, each identified by a virtual port number and/or virtual IP address. The AMF, SOF, SMF, SDN controller, OSS/BSS or any VNF can be on a single computer or distributed across multiple computers identified by at least an IP address, MAC address and one or more Port numbers.

The IP address of a User Equipment (UE) is assigned from a private address space by the SMF for packet forwarding within the mobile core network, providing a local routability. However, the UE's IP address must be translated into a public IP address before entering the public Internet so that the UE's traffic is globally routable. Network Address Translation (NAT) only deals with 1:1 translation (i.e., each private address is translated into a public address). The n:1 translation (i.e., each group of 'n' number of different private addresses is translated into a single public address), however, it demands an adaptation of the port number locally chosen by the UE to a different port number to uniquely identify each UE. This method is known as Port and Address Translation (PAT) or Network Address Port Translation (NAPT). So, PAT replaces the UE's private IP address with a public IP address (and vice versa). In addition, the UE's utilized port number is replaced by one of PAT free port numbers from a large pool. When we use the term 'IP address and port number' for a UE, we mean the SMF assigned private address when UEs data packets travel within the operator's core network, and the UPF/PAT-translated public IP address and port address pair when UEs data packets travel the public Internet. The SMF either directly instructs the UPF/PAT for the IP address and port number mapping, or indirectly instructs UPF/PAT via the UPF controller.

Note that while the illustrated examples in the specification discuss mainly 5G networks relying on SBA using SDN (as Internet Engineering Task Force [IETF] and Open Networking Forum [ONF] defined), and NFV (as European Telecommunications Standards Institute (ETSI) defined), embodiments of the invention may also be applicable in other kinds of network (mobile and non-mobile) that are sliceable.

Figure 1:
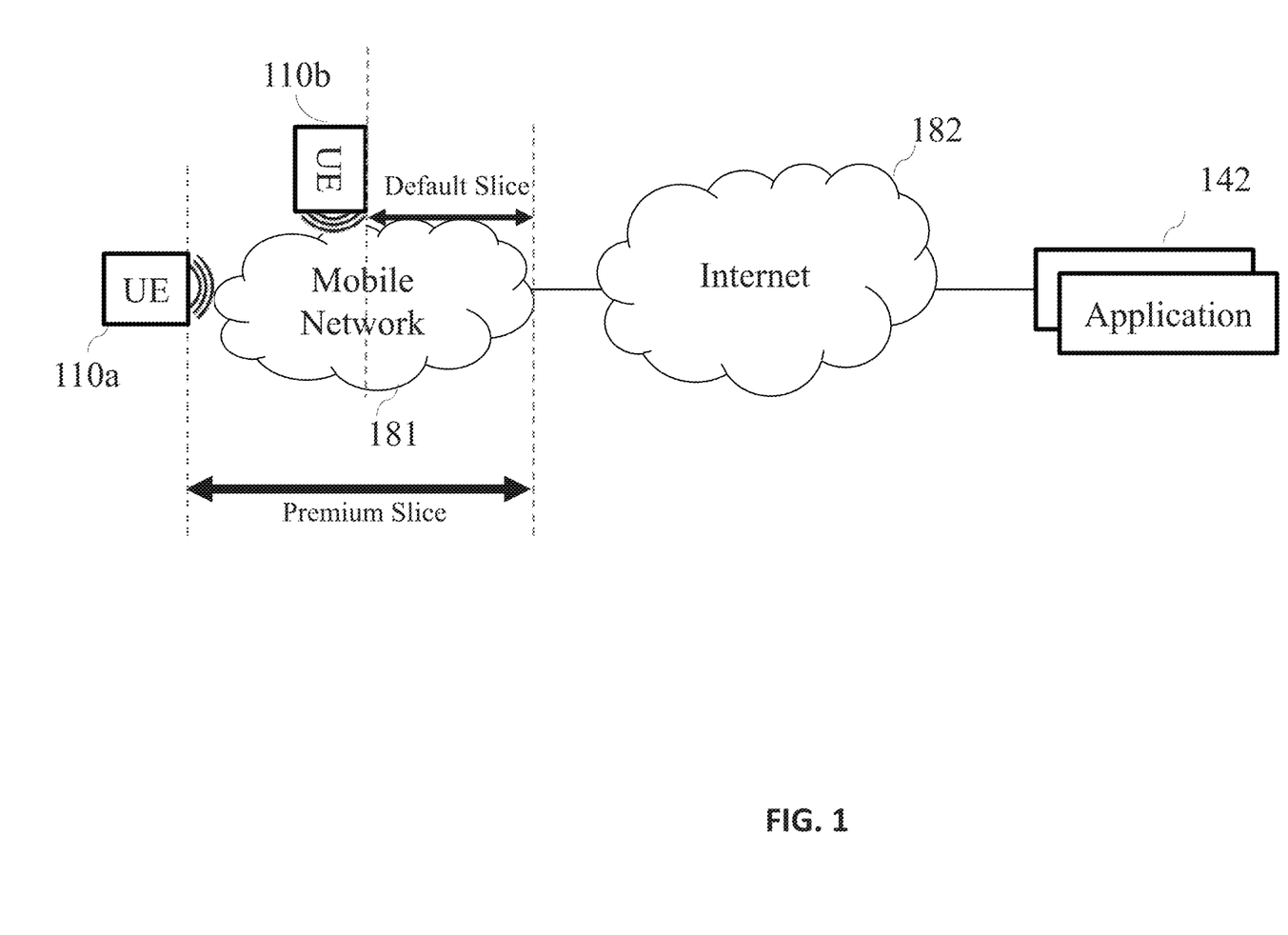
FIG. 1 illustrates an exemplary configuration according to this invention.

FIG. 1 illustrates an exemplary configuration according to this invention. Service application 142 (such as Netflix®, Hulu®, Zoom®, HBO®, etc.) is attached to the public Internet 182 via an IP connection, assuming that the application uses IP protocol at layer 3. The subscriber first signs up to the application and gets a username and password. When the user wants to use the application, he/she signs-in using the username/password. Some of the subscribers, such as user 110a and 110b, may be attached to the mobile operator's network 181 because they use mobile User Equipment (UE) to access application 142. Subscriber (UE) 110b is a regular subscriber of the service, whereas subscriber (UE) 110a is a premium (or VIP) subscriber. According to an aspect of this invention, the mobile operator assigns a premium slice to subscriber 110a within the mobile operator's network 181. Regular users use the default slice. The slice assignment to the premium user is made by the application 142's registration of UE 110a to the premium slice. The financial and legal terms and conditions (legal SLAs) of the usage of the premium slice is determined between the application service provider and the mobile operator. The users are not engaged in this process.

In some cases, application 142 may have a content server within the mobile network 181, deployed as a Virtual Network Function (VNF) or a Physical Network Function (PNF), in the edge-cloud of the radio access network (RAN) so that it is as close as possible to its mobile premium users. Such content servers may be distributed throughout the RAN. In some other cases, application 142 may have a content server within the mobile network 181, deployed as a VNF or PNF, but in the mobile core network close to or within a User Plane Functions (UPF). In yet another cases, application 142 may have a content server completely outside of the mobile network but attached to the mobile network via the public Internet. Many such topological variations of application 142's location on the IP cloud is covered by this invention.

Figure 2:
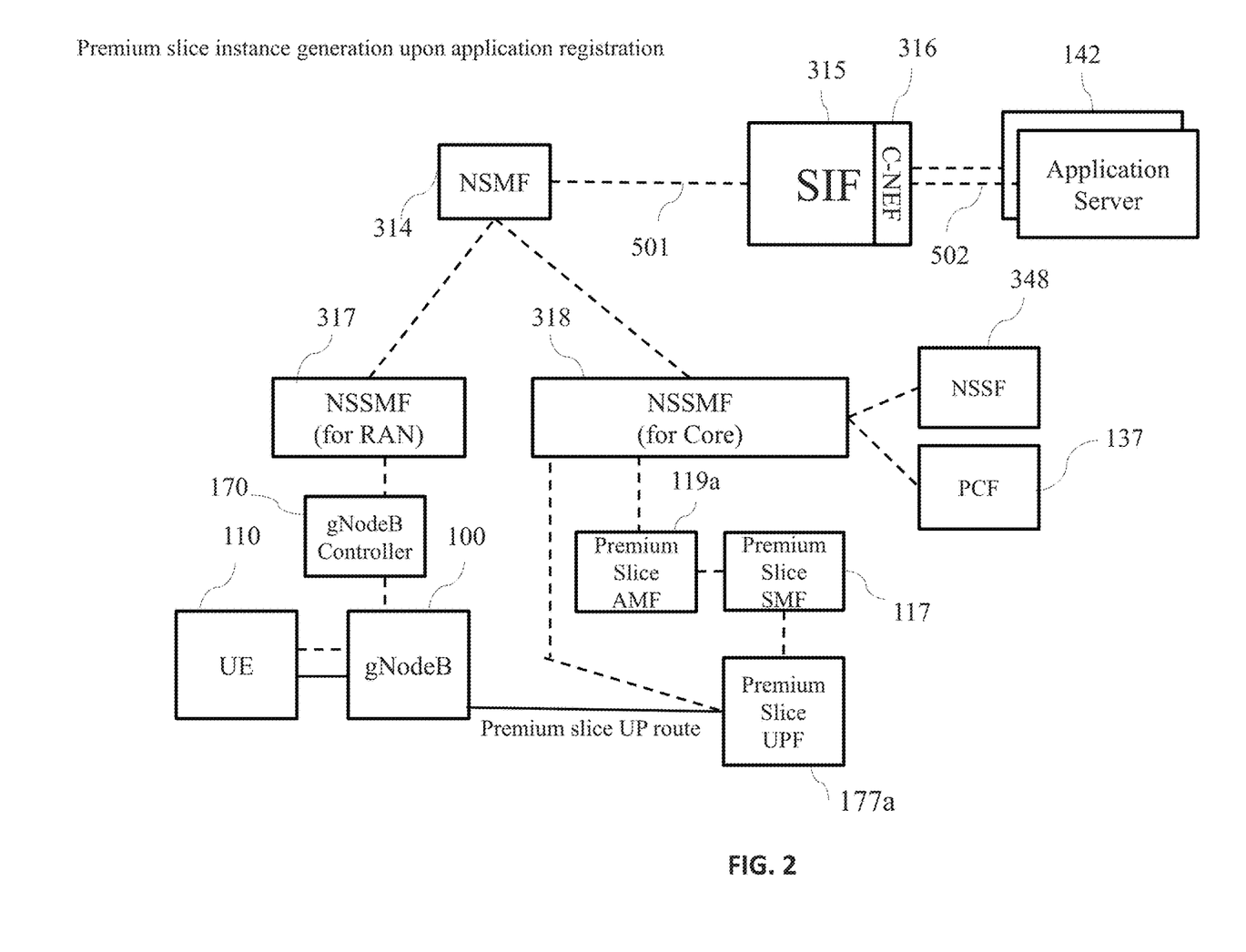
FIG. 2 illustrates control plane (CP) components for slice registry.

FIG. 2 illustrates an exemplary 5G control network that includes Slice Identification Function (SIF) 315 according to this invention. SIF is implemented as a VNF or PNF, and can be an integral component of another control function such as the NSSF or PCF. It is primarily attached to a plurality of applications 142, each application offering a different type of service. Since SIF 315 is a control function, it has to provide an open interface towards applications using control network exposure function (C-NEF) 316, which can be an internal or external component of SIF 315, and provide a highly secure access. SIF 315 has an interface with NSMF 314 to send information about the slice subscriptions of each registered application in the form of one or more sNSSAIs. Note that application 142 can subscribe to a single slice for its premium users, or a plurality of slices depending on its subscription structure. NSMF 314 communicates with downstream Network Slice Subnet Management Function (NS SMF) 317 and 318 to configure segments of the slice instance over the RAN and core network, respectively. NSSMF 318 activates AMF 119a, SMF 117, and UPF 177a instances, then configures them together with NSSF 348 and PCF 137. This invention also covers the case where premium slice users can be served by common AMF, SMF, or UPF, depending on the slice requirements. The configuration of NSSF 348 is critical for AMF selection. Similarly, NSSMF 317 configures the slice over the RAN by configuring the slice parameters on gNodeB controller 170 (such as the RAN Intelligent Controller (RIC) or CU-CP), which in turn configures gNodeB 100 for all gNodeBs within the RAN. The configuration steps of a slice on the RAN and core network are specified in the 3GPP specifications, and hence not recited here.

Figure 3:
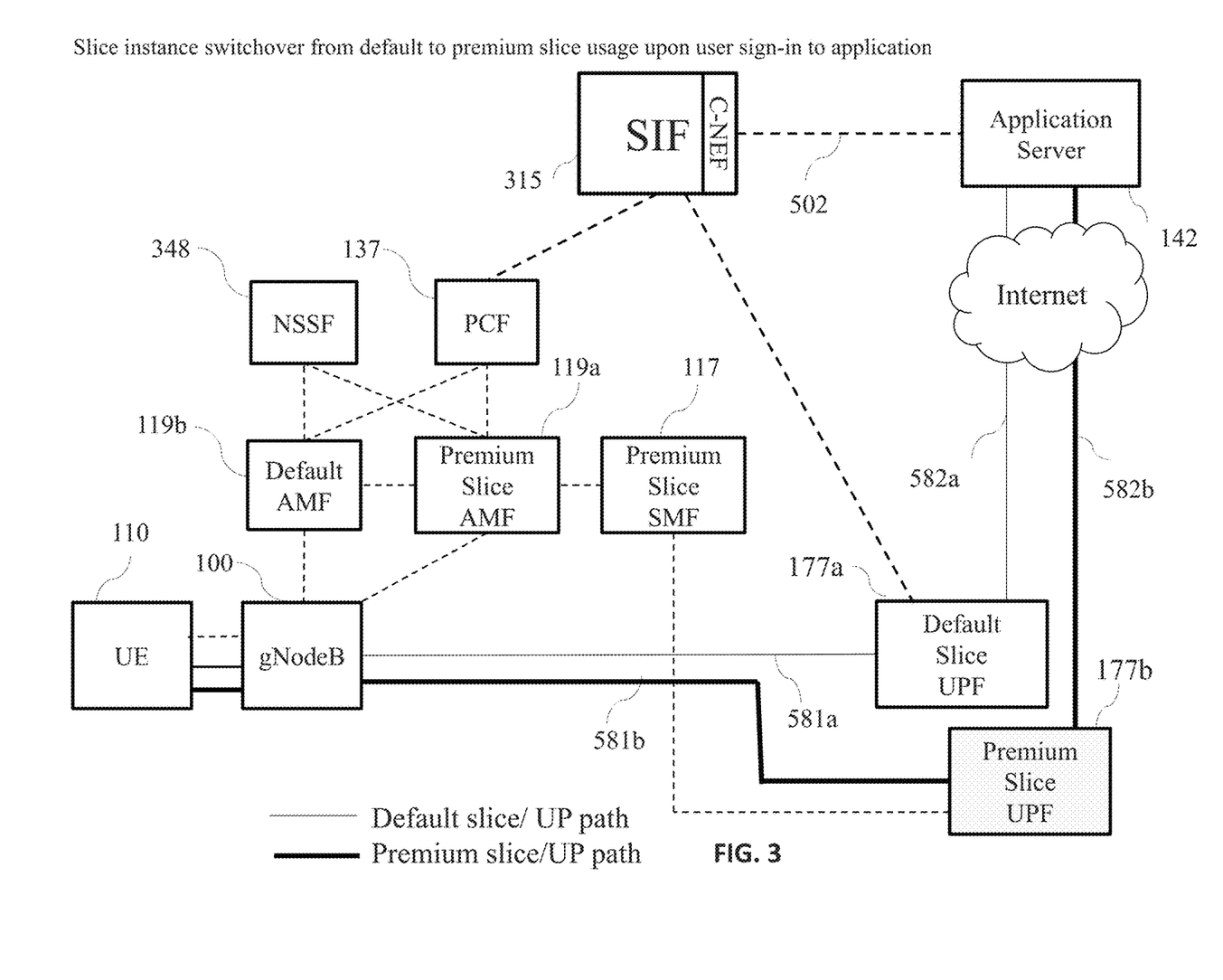
FIG. 3 illustrates control plane (CP) components for slice switchover.

FIG. 3 illustrates all actors of the control plane and user plane functions that are engaged in the process of mobile user 110 connecting to application 142 first using the default slice and then switching to using a premium slice. When UE connects to the mobile network, the control network executes the default user registry process. AMF 119b first assigns a default slice SMF to the user, which then selects UPF 177a. The default path towards application 142 is 581a and 582a. When user signs, the application 142 sends a message to SIF 315 with the user identification information. SIF 315 uses this information to trigger the control network components to change UE configuration from default slice to premium slice. Once the slice switchover is achieved, the premium slice path towards the application that is marked as 581b and 582b through UPF 177b is used.

Figure 4:
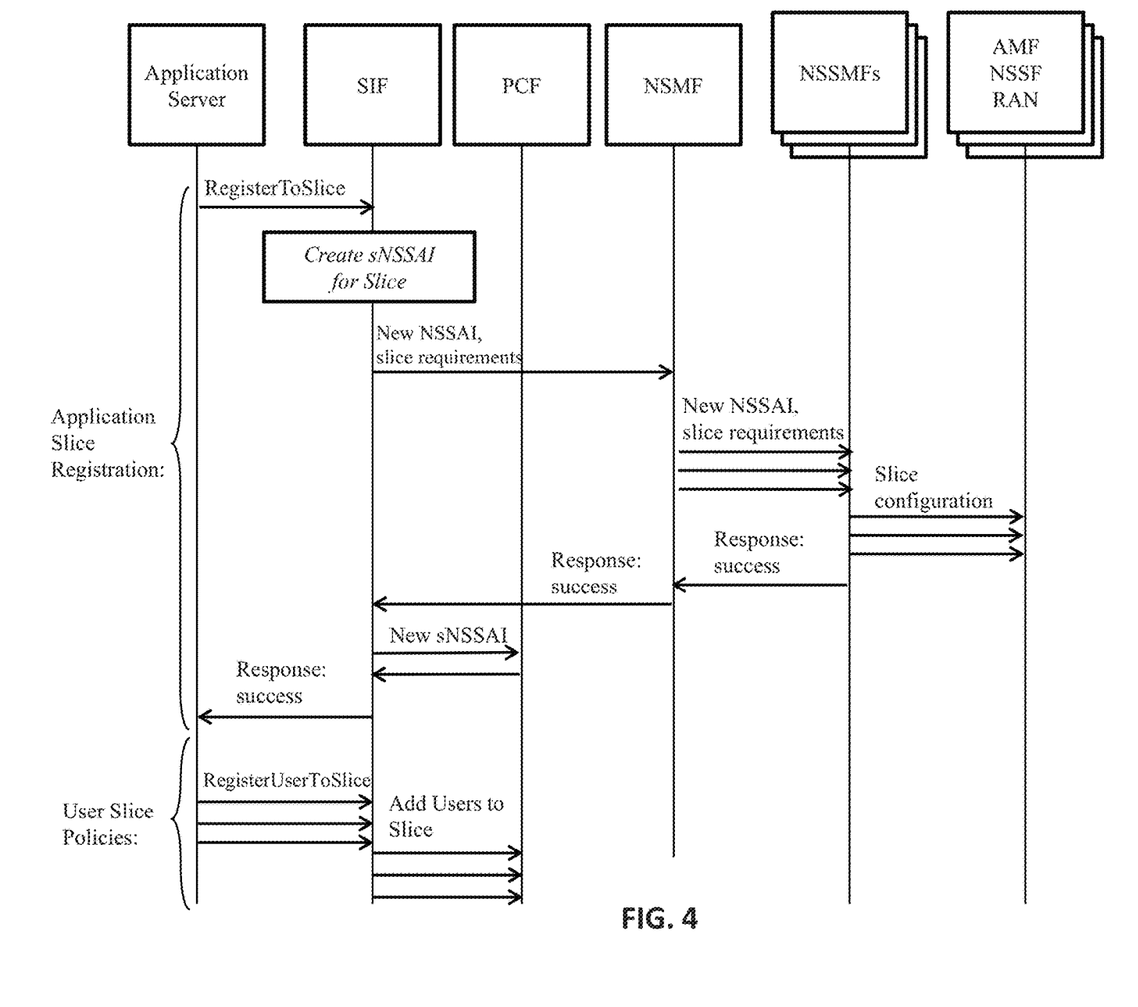
FIG. 4 illustrates steps of registration of an application according to the present invention.

In an embodiment of this invention, the application first registers to SIF using a new 'registration notification' procedure created specifically for an application's subscription to a network slice (FIG. 4), which includes the following exemplary registration messages:

(a) <RegisterToSlice {AppName, AppSliceName, ServiceRequirements}>: Registering a new slice and its service requirements to operator network. AppName field describes the name of the application (i.e. Netflix®, Hulu®, Zoom®, HBO®, etc.), AppSliceName field describes slice name created by application server (i.e. Premium, High-Definition, etc.), and ServiceRequirements field describes traffic requirements of the slice (i.e. maximum bandwidth, minimum bandwidth, latency, etc.).

(b) <RegisterUserToSlice {AppName, AppSliceName, UserIdentifier}>: Registering the user that will be using each registered application slice. UserIdentifier is an identifier which is known to both application and operator network (i.e. IP&port number, telephone number, IMSI/SUPI, IMEI/PEI, etc.). If the application knows one alternative UserIdentifier, the user can be registered the user to slice with that information.

(c) <RegisterUserGrpToSlice {AppName, AppSliceName, UserIdentifier, UserIdentifier, UserIdentifier n>: Registering UserIdentifiers of a group of users in batch-mode.

(d) <UnregisterToSlice {AppName ?}>: Unregistering the application, a single user, or a group of users specified in (a), (b) and (c) above using the corresponding unregister messages.

The SIF keeps all registry information obtained during the registration procedure in a database. Preliminary to RegisterToSlice message, the service provider may provide a menu of options with slice types and their associated SLAs to facilitate the application service provider's choice of a slice in which case RegisterToSlice message does not need to include slice ServiceRequirements.

As SIF receives RegisterToSlice message, the configuration of the premium slice instance has the following steps:

(a) SIF creates the sNSSAI, converts service requirements of application to 3GPP slice requirements, and informs the NSMF about sNS SAI and slice requirements (for standard message definitions, see 3GPP document TS 28.541).

(b) NSMF instructs all required NSSMFs to configure the slice segments/subnets with slice SLA (for standard message definitions, see 3GPP document TS 28.541).

(c) NSSMFs
  a. create at least one AMF, one SMF, and one UPF instances to serve the premium slice, or inform existing instances with new slice configuration,
  b. configure NSSF with AMF selection, if a new AMF instance is created, and
  c. configure all RAN components to serve the premium slice users.

(d) Upon completion of the above steps, SIF adds a policy per user group to PCF concerning the use of the premium slice.

(e) After application slice registration is completed, Application server can register known users to the created slice by RegisterUserToSlice messages. As new users subscribe to the application over time, these additional users are registered either one by one or in batch mode.

Figure 5:
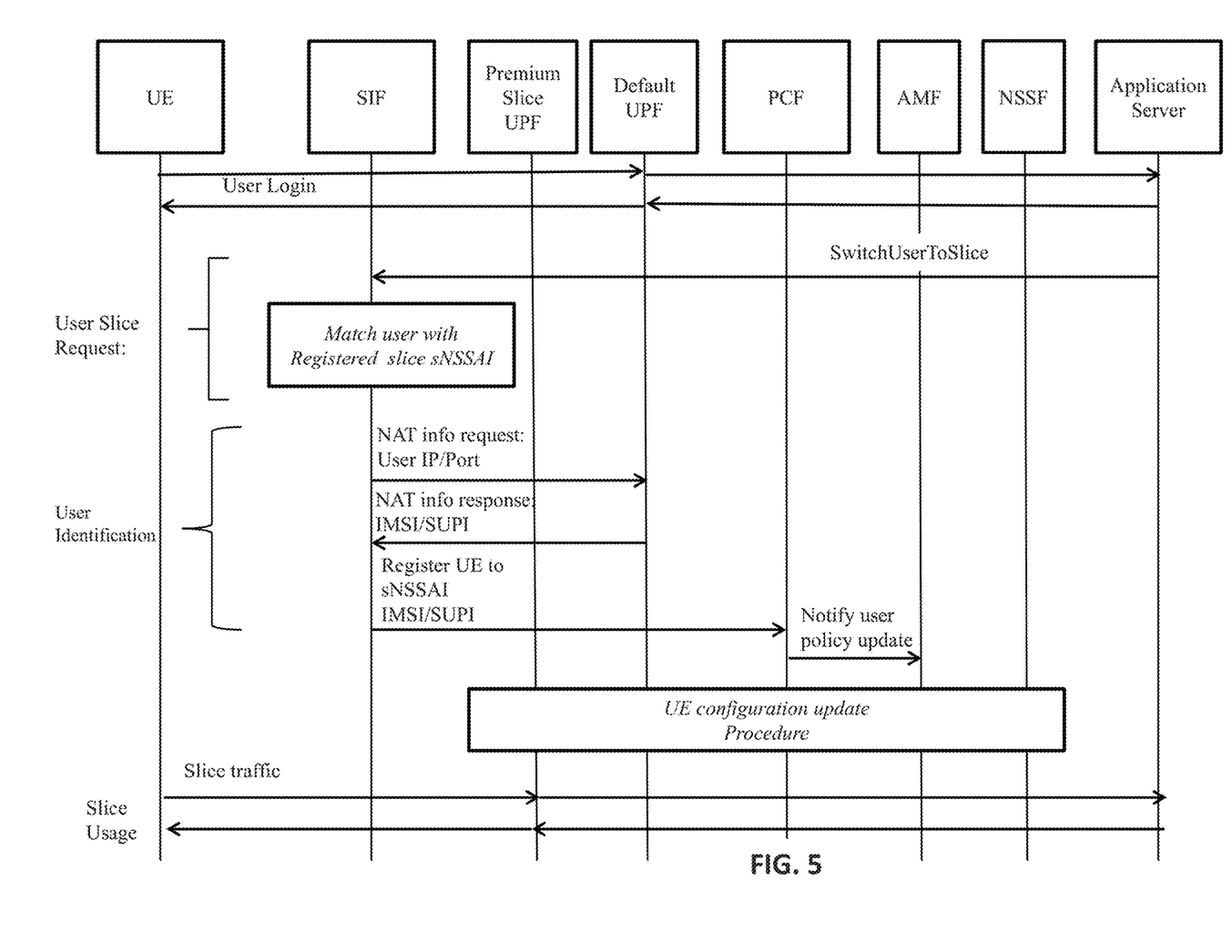
FIG. 5 illustrates steps of slice switchover of the UE according to the present invention.

When the registered application's mobile premium user connects to the mobile network using the default slice during application sign-in, the application recognizes the user and sends a <connection notification> to SIF with the user's identification such as the mobile phone number or IP address and port number to initiate the switch-over from default slice to the premium slice. If the telephone number or any other user identity known to both operator and application exists, the user can be switched to the application's slice. However, when such identity is not known to the application, the user can be switched to the registered slice by its internet IP and port number (see FIG. 5). The following two messages are used by application server to switch or release user to the application slice;

(a)<SwitchUserToSlice {AppName, AppSliceName, UserIP, UserPort}>):
The application initiates the user's switch-over to the premium slice by sending this message to SIF.

(b)<Release UserToSlice {AppName, AppSliceName, UserIP, UserPort}>): The application terminates the user's use of the premium slice by sending this message to SIF. The process that initiates this message may be the user logout from application.

After receiving SwitchUserToSlice message, (a) SIF matches the AppSliceName with corresponding sNSSAI for the user.

(b) SIF sends internet IP and port number of the user to UPF to learn its identity. This identity may be IMSI/SUPI, which is known to other core network functions such as AMF, PCF, etc.

(c) After learning the identity of the user, SIF registers a new policy to PCF that includes association of sNSSAI with the user.

(d) PCF may notify AMF for policy change and trigger UE configuration update procedure. The notification message is defined as Npcf_AMPolicyControl_UpdateNotify (see 3GPP document TS 23.502).

(e) When UE configuration update procedure happens,
  a. A new QoS flow and bearer are created for UE with new sNSSAI service requirements.
  b. UPF of the user may change depending on the definition of the slice and the new QoS flow tunnels are directed to new Premium Slice UPF.
  c. AMF may be updated by querying slice subscription in NSSF.

(f) As a result, the UE traffic passes through premium slice UPF with new QoS flows and bearers are defined with new sNSSAI.

Figure 6:
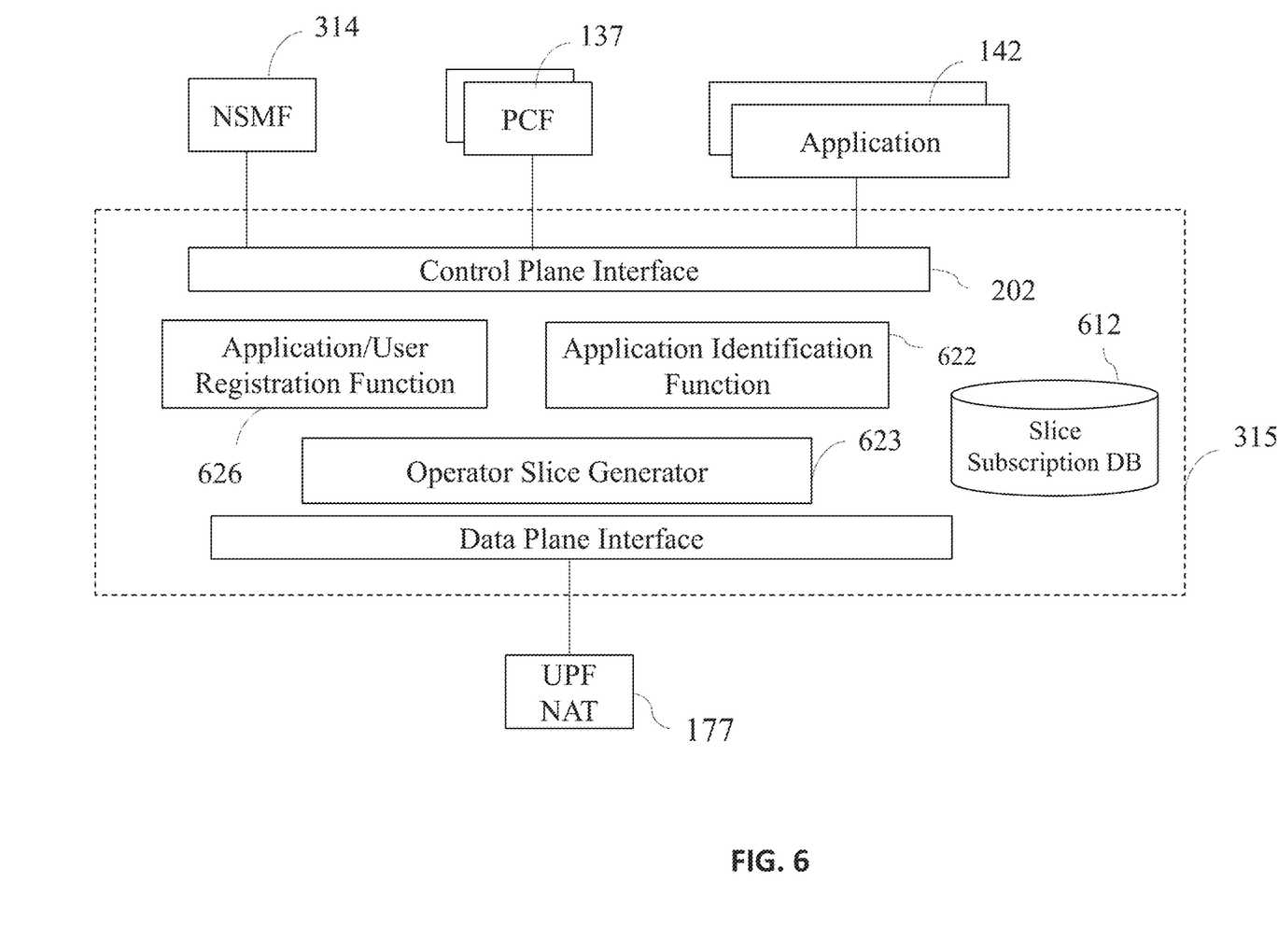
FIG. 6 depicts a simple block diagram showing components of SIF.

FIG. 6 introduces functional block diagram of SIF. SIF has two interfaces one for the control plane and the other for the data plane. Data plane interface is used only for the query of identity of the user by using the user's IP address and port number. Slice subscription DB 612 maintains AppName, AppSliceName, and sNSSAI fields to match application server and operator core network slice. This matching also mapped to service requirements obtained by application server and created for operator network. Application Identification Function 622 manages the registration of the application, while Application/User Registration Function 626 manages registration of each user to application slice. Operator Slice Generator 623 function creates suitable sNS-SAIs and maps application traffic requirements to 3GPP defined slice requirements (see 3GPP document TS 28.541). Operator Slice Generator 623 should be configured by operator with a pre-defined slice identity range, which is only used by SIF.

In one embodiment, the present invention provides a method comprising: at least one service application subscribing to a first Radio Access Network (RAN) slice for a first set of mobile users, the first RAN slice set aside for preferential treatment of the first set of mobile users, the first RAN slice also having associated with it a second set of mobile users, the first set of mobile users different than the second set of mobile users; and providing a higher Quality of Service (QoS) and/or a higher priority to the first set of mobile users of the at least one service application as compared to the second set of mobile users.

In another embodiment, the present invention provides a method comprising: a service application subscribing to a first, premium, Radio Access Network (RAN) slice for a set of premium mobile users, the first RAN slice set aside for preferential treatment of the premium mobile users; a set of non-premium mobile users assigned to a second RAN slice, the premium mobile users different than the non-premium mobile users; and providing a higher Quality of Service (QoS) and/or a higher priority to the premium mobile users of the service application as compared to the non-premium mobile users, wherein an application service provider provides different grades of services that are priced differently based on content type and content delivery quality, wherein the premium mobile users of the first, premium, RAN slice receiving a better quality service experience compared to the non-premium service users of the second RAN slice.

In yet another embodiment, the present invention provides a method comprising: at least one service application subscribing to a first Radio Access Network (RAN) slice for a first set of mobile users, the first RAN slice set aside for preferential treatment of the first set of mobile users, the first RAN slice also having associated with it a second set of mobile users, the first set of mobile users different than the second set of mobile users; providing a higher Quality of Service (QoS) and/or a higher priority to the first set of mobile users of the at least one service application as compared to the second set of mobile users, and presenting a Slice Identifier Function (SIF) to register the at least one service application and each of the first set of mobile users to the first RAN slice, wherein the SIF has an embedded Control Network Exposure Function (C-NEF) that enables a new control plane function to interact with the at least one service application.

Computer-executable instructions include, for example, instructions and data that cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be to described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

CONCLUSION

A system and method have been shown in the above embodiments for the effective implementation of a system, method and article of manufacture for application-driven user slice selection for mobile networks. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. A method comprising:
at least one service application subscribing to a first Radio Access Network (RAN) slice for a first set of mobile users, the first RAN slice set aside for preferential treatment of the first set of mobile users, the first RAN slice also having associated with it a second set of mobile users, the first set of mobile users different than the second set of mobile users;
providing a higher Quality of Service (QoS) and/or a higher priority to the first set of mobile users of the at least one service application as compared to the second set of mobile users, and
wherein a Slice Identifier Function (SIF) is presented to register the at least one service application and each of the first set of mobile users to the first RAN slice, wherein the SIF has an embedded Control Network Exposure Function (C-NEF) that enables a new control plane function to interact with the at least one service application.

2. The method of claim 1, wherein usage of the first RAN slice is triggered by the at least one service application at a time a user within the first set of mobile users signs in to the at least one service application.

3. The method of claim 1, wherein when a mobile user within the first set of mobile users signs in to the at least one service application, the SIF forcing a user configuration change procedure to switchover the mobile user from a previously assigned second RAN slice to the first RAN slice.

4. The method of claim 3, wherein the SIF interfaces with any of, or a combination of, the following control plane functions: a Network Slice Management Function (NSMF), a Policy Control Function (PCF), a User Plane Function (UPF), and service applications through C-NEF.

5. The method of claim 1, wherein the at least one service application first registers with the SIF using a new registration notification procedure, the new registration notification procedure created specifically for the at least one service application's subscription to the first network slice, wherein the new registration notification procedure is completed via an Internet connection between the SIF and the at least one service application.

6. The method of claim 5, wherein as part of the new registration notification procedure, subscribers of the at least one service application are also registered.

7. The method of claim 6, wherein when the mobile user initially connects to a mobile network using a default slice for application sign-in, the at least one service application recognizes the mobile user and starts a connection notification procedure, wherein the SIF coordinates the switchover from the default slice to the first slice, wherein identification of the mobile user by SIF is performed using an IP address and port number associated within an IP packet of the mobile user, the IP packet used during sign in of the mobile user, and wherein the SIF coordinates with control network functions to translate the IP address and the port number to a user identifier.

8. The method of claim 7, wherein a service provider provides a menu of options with slice types and their associated SLAs to facilitate an application service provider's choice of a specific RAN slice.

9. An article of manufacture comprising non-transitory computer storage medium storing computer readable program code which, when executed by a processor, implements a method comprising:
   computer readable program code executed by the processor to implement at least one service application subscribing to a first Radio Access Network (RAN) slice for a first set of mobile users, the first RAN slice set aside for preferential treatment of the first set of mobile users, the first RAN slice also having associated with it a second set of mobile users, the first set of mobile users different than the second set of mobile users;
   computer readable program code executed by the processor to provide a higher Quality of Service (QoS) and/or a higher priority to the first set of mobile users of the at least one service application as compared to the second set of mobile users, and
   computer readable program code executed by the processor to present a Slice Identifier Function (SIF) to register the at least one service application and each of the first set of mobile users to the first RAN slice, wherein the SIF has an embedded Control Network Exposure Function (C-NEF) that enables a new control plane function to interact with the at least one service application.

10. The article of manufacture of claim 9, wherein usage of the first RAN slice is triggered by the at least one service application at a time a user within the first set of mobile users signs in to the at least one service application.

11. The article of manufacture of claim 9, wherein when a mobile user within the first set of mobile users signs in to the at least one service application, the SIF forcing a user configuration change procedure to switchover the mobile user from a previously assigned second RAN slice to the first RAN slice.

12. The article of manufacture of claim 11, wherein the SIF interfaces with any of, or a combination of, the following control plane functions: a Network Slice Management Function (NSMF), a Policy Control Function (PCF), a User Plane Function (UPF), and service applications through C-NEF.

13. The article of manufacture of claim 9, wherein the at least one service application first registers with the SIF using a new registration notification procedure, the new registration notification procedure created specifically for the at least one service application's subscription to the first network slice, wherein the new registration notification procedure is completed via an Internet connection between the SIF and the at least one service application.

14. The article of manufacture of claim 13, wherein as part of the new registration notification procedure, subscribers of the at least one service application are also registered.

15. The article of manufacture of claim 14, wherein when the mobile user initially connects to a mobile network using a default slice for application sign-in, the at least one service application recognizes the mobile user and starts a connection notification procedure, wherein the SIF coordinates the switchover from the default slice to the first slice, wherein identification of the mobile user by SIF is performed using an IP address and port number associated within an IP packet of the mobile user, the IP packet used during sign in of the mobile user, and wherein the SIF coordinates with control network functions to translate the IP address and the port number to a user identifier.

16. The article of manufacture of claim 15, wherein a service provider provides a menu of options with slice types and their associated SLAs to facilitate an application service provider's choice of a specific RAN slice.

* * * * *